United States Patent Office 3,685,960
Patented Aug. 22, 1972

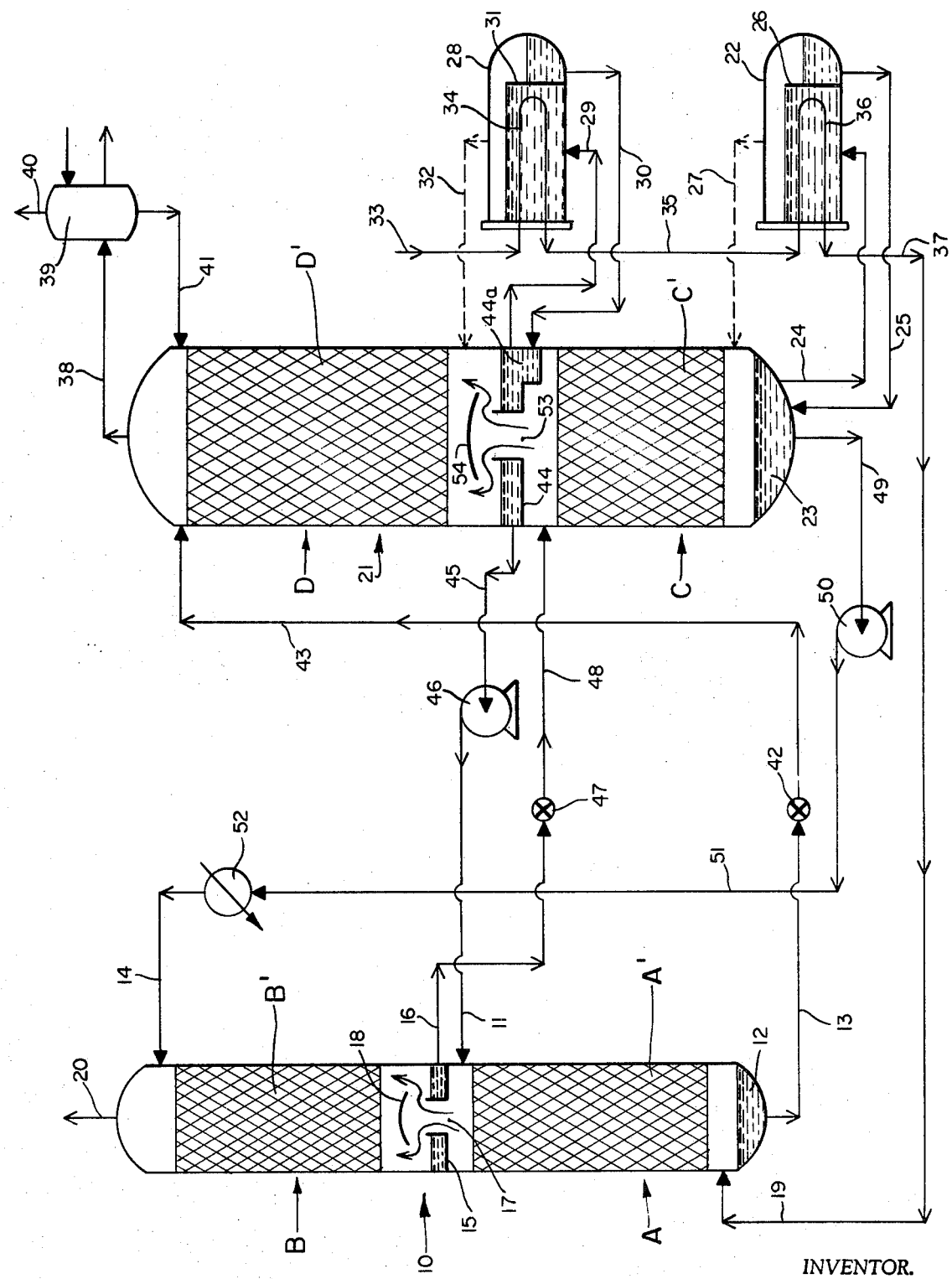

3,685,960
SEPARATION OF CO₂ AND H₂S
FROM GAS MIXTURES
Homer E. Benson, Pittsburgh, Pa., assignor to
Benson, Field and Epes
Filed Sept. 19, 1969, Ser. No. 859,466
Int. Cl. B01d 53/34
U.S. Cl. 423—229                              5 Claims

ABSTRACT OF THE DISCLOSURE

Method for removing $CO_2$ and $H_2S$ from gas mixtures in a two-step system in which the first step removes the bulk of the acid gas by scrubing with an aqueous alkaline scrubbing solution in a high-pressure absorption zone maintained at a temperature near the atmospheric boiling point of the solution. The second purification step, where the acid gas content is reduced to low residual levels, is carried out by contacting the partially purified gas in a second, separate high-pressure absorption zone with a second aqueous scrubbing solution having a different composition than the first and comprising potassium carbonate containing at least about 6% by weight of an alkanolamine, the solution temperature in the second step being maintained at an intermediate absorption temperature of from about 50° C. to 90° C., and preferably 60° C. to 80° C.

---

This invention relates to the removal of acid gases comprising $H_2S$ and/or $CO_2$ to provide a purified gas having a low residual acid gas content.

In the purification of industrial gases containing $CO_2$ and/or $H_2S$, one of the most widely used processes utilizes aqueous potassium carbonate solutions which are circulated in a cyclic process between an absorption stage where the acid gases are absorbed and a regeneration stage where the absorbed acid gases are desorbed by steam-stripping. For high thermal efficiency, the absorption and regeneration stages are operated, at least for the most part, at the same temperatures, namely at temperatures in the vicinity of the atmospheric boiling temperature of the scrubbing solution, thus eliminating the otherwise high heat losses that result when the solution is alternately heated and cooled between the absorption and regeneration stages. In recent years, potassium carbonate solutions employed in such "isothermal" scrubbing processes have been improved by the addition of activators, notably alkanolamines, which markedly increase the rate of absorption and also decrease the equilibrium back pressure from the solution.

In order to provide a highly purified product gas, a two-step system has been sometimes employed in which the bulk of the acid gas is first removed down to levels of e.g. 0.5% to 2% in the first step by the isothermal process utilizing a hot potassium carbonate solution. The fine purification (that is, the removal of residual amounts of acid gas down to levels of e.g. 100 to 3000 parts per million) is accomplished in a second step by passing the partially purified gas in contact, for example, with a cold monoethanolamine or diethanolamine solution.

While the two-step process described above is capable of producing a highly purified product gas, the use of cold absorption temperatures in the second step is thermally inefficient since the solution must be alternately heated and cooled over a wide temperature range between the absorption stage, where the gas is treated at low temperatures, and the regeneration stage where the solution is steam-stripped at temperatures in the vicinity of the atmospheric boiling temperature of the solution. A second disadvantage is that it may be necessary to cool the gas stream between the first and second step in order to avoid over-heating the cold solution in the second step. The gases leaving the first hot absorption step are at a temperature of e.g. 105° C. to 120° C. and saturated with water vapor. If the gas mixture in this condition is fed e.g. to a cold monoethanolamine absorber, considerable amounts of heat are transferred to the cold monoethanolamine solution, lowering absorption efficiency while, at the same time, the monoethanolamine solution may become excessively diluted through the condensation of water vapor contained in the gas stream. A third disadvantage of the solutions such as monoethanolamine or diethanolamine solutions is their considerable volatility which often results in substantial losses of these reagents, particularly during the steam-stripping regeneration step.

In accordance with the present invention, a new method has been found for treating $CO_2$ and/or $H_2S$ gas mixtures in a two-step system which is free from the disadvantages discussed above. In accordance with this new method, the bulk of the acid gas is removed in a first purification step, using the so-called isothermal system in which the gas mixture is contacted with a first aqueous alkaline scrubbing solution in an absorption zone maintained under substantial superatmospheric pressure and at a temperature in the vicinity of the atmospheric boiling point of the scrubbing solution. The fine purification of a gas is carried out in a second step by contacting the partially purified gas with a second aqueous scrubbing solution having a different composition than the first solution and comprising potassium carbonate containing at least about 6% by weight of an alkanolamine, the second step being carried out in a second, separate absorption zone maintained under substantial superatmospheric pressure and at intermediate temperatures of from about 50° C. to 90° C., and preferably 60° C. to 80° C.

The use of potassium carbonate solutions containing substantial concentrations of an alkanolamine at such intermediate temperatures for the second purification step following bulk purification by the hot, isothermal process provides an ideal two-step process in light of the following considerations developed by extensive study of the characteristics of alkanolamine-containing potassium carbonate solutions. In the case of pure potassium carbonate solutions (i.e. not containing alkanolamine activators), it has been previously known that, if the absorption temperature decreases, the back pressure of acid gas from the solution drops off rather rapidly. At the same time, however, the acid gas absorption rate of such solutions drops off drastically with decreasing temperatures, making the use of such solutions impracticable at temperatures below about 90° C.

In the case of pure alkanolamine aqueous solutions, on the other hand, the absorption rate, both at high and low temperatures, is quite high, but the equilibrium back pressure from the solution goes up rapidly with temperature such that, as a practical matter, such solutions must be used at cool temperatures of e.g. 30° C. to 35° C.

It has been found, surprisingly, that mixtures of potassium carbonate with substantial amounts of alkanolamines (that is, at least about 6% by weight, and preferably from 8% to 12% by weight of the alkanolamine) have high absorption rates at intermediate temperatures of the order of 50° C. to 90° C. comparable to those obtained with pure alkanolamine solutions. At the same time, the back pressure of $CO_2$ from such solutions at such temperatures, particularly when the acid gas content of the solution is at low or moderate levels, is comparable to the low back pressures obtained with pure potassium carbonate solutions.

This surprising combination of high absorption rates and low acid gas equilibrium back pressures at such intermediate temperatures eliminates the disadvantages discussed above for the use of a cool absorption step for fine purification. Because of the considerably higher temperatures that are used according to the invention in the fine purification step, it is not necessary to cool the hot gas stream from the first, hot absorption step, and the amount of water condensation occurring in the second step is markedly reduced. At the same time, a high rate of absorption is maintained in the second step, characteristic of absorption rates obtained with pure amine and, because of the low equilibrium back pressure of the solution, comparable to that obtained with pure potassium carbonate solutions, purification down to low residual levels of acid gas is possible. Finally, because the alkanolamine, when mixed with potassium carbonate, is much less volatile than a pure alkanolamine solution, volatility losses are greatly reduced.

According to a particularly preferred embodiment of the invention, the first isothermal purification step, in which the bulk of acid gas is removed, employs a potassium carbonate solution activated with a smaller amount of alkanolamine (not more than about 5% by weight) than is employed in the potassium carbonate solution used in the second, fine purification step. The use, for example, of a potassium carbonate solution containing 2% to 3% of an alkanolamine in the first step and a potassium carbonate solution containing about 10% alkanolamine in the second step gives highly desirable results. The choice of relatively low concentrations of alkanolamine in the first step stems from the discovery that potassium carbonate scrubbing solutions, when operating at temperatures in the vicinity of their atmopheric boiling temperature, respond most favorably to the addition of relatively small amounts of alkanolamine activators by undergoing a marked increase in the rate of absorption, as well as a favorable shift in the equilibrium back pressure from the solution. While the absorption rate continues to increase as larger amounts of ethanolamine are employed, the rate of increase of absorption rate is much slower with increasing amounts of alkanolamine, particularly when the amount is increased above 5% by weight. It has also been found that at such high operating temperatures, the equilibrium back pressure from the solution begins to rise with increasing amounts of alkanolamine. This increase in equilibrium back pressure is particularly pronounced when the acid gas content of the solution is high, i.e. when the solution contains a relatively high content of absorbed $CO_2$ and/or $H_2S$. This latter factor is an important consideration in the first step involving bulk removal of the acid gas wherein the solution at the bottom portion of the absorber will have a high content of acid gas. As a result of the foregoing consideration, in the two-step process of the invention wherein each absorption step operates at different temperatures and using different solution compositions, it has been found highly desirable to operate the first, high-temperature, isothermal absorption step using alkanolamine-activated potassium carbonate solutions containing no more than about 5%, and preferably from about 1% to 3% of alkanolamine.

For a better understanding of the invention, reference is now made to the accompanying drawing which shows a diagrammatic flow sheet of a particularly preferred embodiment of the invention. The reference numeral 10 refers generally to an absorption column adapted to operate at superatmospheric pressures and containing two absorption zones generally designated by the letters A and B. The absorption column, containing both absorption zones, is maintained at superamtospheric pressures of at least 100 pounds per square inch gage, and preferably at least 200 pounds per square inch gage. Absorber pressures in typical applications of the invention will generally range from 250 to 1500 pounds per square inch gage. The lower zone A of the absorber is provided with cross-hatched section A' representing suitable packing material for producing intimate gas-liquid contact such as Rashig rings, Berl saddles, Intalox saddles, or other types of packing bodies exposing a large surface of liquid to the gas flowing through the packing. Means other than packing materials such as plates equipped with bubble caps, or sieve trays or other means for insuring intimate contact between gas and liquid may also be employed. The upper zone B of the absorber is provided in cross-hatched section B' with similar means for insuring intimate gas-liquid contact.

Lower zone A of the absorber is separately supplied with a regenerated stream of scrubbing solution by line 11 which flows downwardly over the packing or trays in section A' and collects at the bottom of the column in sump 12, and is removed from the column by line 13. Upper zone B of the absorber is supplied with regenerated scrubbing solution by line 14 which flows downwardly over packing or trays in B' and collects at the bottom of zone B on collector plate 15 and is withdrawn from the bottom of zone B by line 16. The gas stream to be treated, containing $CO_2$ and/or $H_2S$, enters the bottom of column 10 by line 19 and flows upwardly countercurrently to the descending scrubbing solution through absorber zone A where the bulk of the acid gas is removed, and then passes through chimney 17 provided in collecting plate 15, and then flows countercurrently to descending liquid in zone B of the absorber where fine purification takes place, and leaves the absorber in a purified condition by line 20. If necessary, the gas leaving the absorber may be passed through a cooler-condenser to condense out water vapor, producing an aqueous condensate. A portion or all of the aqueous condensate may be returned to the top of the absorber, if desired, to maintain the water balance in the system.

It will be noted that zone A and zone B of the absorber column 10 are entirely separate from one another with respect to the flow of scrubbing solution. That is, each zone is separately supplied with its own stream, and scrubbing solution is separately withdrawn from the bottom of each zone. Thus, zone A is supplied with solution by line 11, and solution is withdrawn from zone A by line 13. Zone B is supplied with solution by line 14 and spent scrubbing solution is withdrawn from the bottom of zone B by line 16. It will be noted that solution flowing downwardly through zone B is prevented from entering zone A by collector plate 15 and by a deflector cap 18 positioned over chimney 17 which permits gas to pass upwardly from zone A to zone B while preventing the flow of solution from zone B to zone A.

Spent solution leaving zone A and zone B of the absorber column by lines 13 and 16, respectively, is conducted to regeneration column 21 where each stream of solution is separately regenerated. The regeneration column 21 contains two separate regeneration zones, C and D, provided with cross-hatched sections C' and D', respectively, provided with packing, plates, or similar means for insuring intimate gas-liquid contact. Spent solution leaving zone A of the absorber by line 13 passes through pressure letdown valve 42 where the pressure is reduced to that prevailing at the top of regeneration zone D and then introduced into the top of zone D by line 43. Due to the sharp reduction in pressure, some acid gas, together with some steam, will flash off at the top of the regeneration column and the partially regenerated solution then flows downwardly through section D' countercurrently to stripping steam introduced into the bottom of zone D by line 32·

Regenerated scrubbing solution collects at the bottom of zone D on collecting plate 44 and is withdrawn from zone D by line 45 and recirculated by recycle pump 46 and line 11 to the top of absorption zone A.

Spent scrubbing solution leaving zone B by line 16 passes through pressure letdown valve 47 where the pressure is reduced to that prevailing at the top of zone C and then is introduced by line 48 into the top of zone C whence it flows down through section C' countercurrently to stripping steam introduced at the bottom of zone C by line 27. Regenerated scrubbing solution collects at the bottom of zone C in sump 23. Solution from sump 23 is recycled to the top of absorption zone B by line 49; recycle pump 50; line 51; cooler 52, where the solution is cooled to a temperature in the range of about 50° C. to 90° C., and then introduced by line 14 to the top of zone B.

Since the bulk of the acid gas is absorbed in the absorption cycle comprising absorption zone A and regeneration zone D, with only minor amounts of acid gas absorbed in the cycle comprising absorption zone B and regeneration zone C, the flow of solution through the first absorption cycle will be considerably larger than the relatively small amount circulating in the second absorption cycle. In typical cases, the solution flow in the second absorption cycle will comprise from 5% to 35% of the total solution flow in both cycles, and more usually from 10% to 20% of such total solution flow.

In the embodiment shown in the drawing, stripping steam for the two regeneration zones is supplied by means of solution reboilers 22 and 28, serving regeneration zones C and D, respectively. In the embodiment shown, both reboilers are heated by means of hot, steam-containing process gas, to be treated for the removal of its acid gas content introduced into the system by line 33. This may be, for example, a gas containing 15% to 20% $CO_2$ produced by the reforming of natural gas at a temperature of e.g. 170° C., and saturated with steam. The hot, saturated feed gas is introduced by line 33 into coil 34 of reboiler 28 where part of the heat content of the gas is transferred to the scrubbing solution. The partially cooled process gas then is conducted by line 35 to coil 36 of reboiler 22 where additional heat is transferred to the scrubbing solution and the cooled process gas is then conducted by line 37 and line 19 to the bottom of the absorber column 10 for removal of its $CO_2$ content. In reboiler 22 scrubbing solution from sump 23 is circulated through the reboiler by line 24 which introduces the solution into the reboiler. The solution then overflows baffle 26 and is recirculated back to sump 23 by line 25. Steam generated in reboiler 22 by boiling of the scrubbing solution is introduced into the bottom of zone C by line 27.

Scrubbing solution from sump 44a at the bottom of zone D is circulated into reboiler 28 by line 29. The solution overflows baffle 31 and is then returned to sump 44a by line 30. Steam produced in reboiler 28 by boiling of the scrubbing solution is introduced into the bottom of zone D by line 32.

It will be noted that a chimney 53 is provided in collecting plate 44 which permits stripping steam and desorbed $CO_2$ from zone C to pass upwardly into zone D where it continues to travel upwardly in contact with scrubbing solution introduced by line 43. Scrubbing solution from zone D is prevented from entering zone C by collecting plate 44 and deflector cap 54. With this arrangement, stripping steam introduced into the bottom of zone C from reboiler 22 is reused in zone D. The reuse of the stripping steam from zone C in zone D is feasible where zone C is supplied with an excess of stripping steam such that the mixture of steam and $CO_2$ entering the bottom of zone D is relatively poor in $CO_2$. The $CO_2$ content of the stripping steam from zone C will, in any case, tend to be lean in $CO_2$ because the spent scrubbing solution treated in regeneration zone C will contain a relatively low concentration of acid gas due to the relatively low concentration of acid gas in the gas stream treated in absorption zone B. It is advantageous to supply zone C with an excess of stripping steam since this tends to regenerate very thoroughly the scrubbing solution in zone C and the stripping steam, containing only small concentrations of $CO_2$, can be advantageously reused for steam-stripping in zone D.

A mixture of acid gas and steam collecting at the top of the regeneration column 21 is removed by line 38 and conducted to cooler-condenser 39 where a portion of the water vapor is condensed and the aqueous condensate refluxed to the top of the regeneration tower by line 41 to maintain the proper water balance in the system. If desired or necessary to maintain proper water balance, a portion of the water condensate may be refluxed to the top of regeneration zone C. The mixture of acid gas and residual water vapor is removed from the system by line 40 for any desired use.

EXAMPLE

The operation of the system shown in the drawing will now be illustrated by the following typical example. A hot process gas, produced by the steam-reforming, followed by water-gas shift, of natural gas and containing 18% $CO_2$ and at a temperature of 170° C., a pressure of 400 p.s.i.g., and saturated with steam is introduced into the system by line 33. The hot process gas passes through reboilers 28 and 22 in series as shown to raise stripping steam for regeneration zones C and D as described above. The process gas, now cooled to a temperature of 125° C., is introduced into the bottom of the absorption column 10 operated at a pressure of 390 p.s.i.g. by line 19. The first regeneration zone A, where the bulk of the acid gas is removed, is supplied with a scrubbing solution consisting of a 30% by weight solution of potassium carbonate containing 3% by weight of diethanolamine by line 11 at a temperature of 108° C. By contact with this scrubbing solution in zone A, the $CO_2$ content of the gas is reduced to 1.0% entering zone B. Zone B is fed with a scrubbing solution containing 20% by weight of potassium carbonate and 10% by weight of diethanolamine, and enters zone B at a temperature of 60° C. By contact with this scrubbing solution in zone B, the $CO_2$ content of the purified gas is reduced to 100 p.p.m. (parts per million) and leaves the absorber by line 20. The solution flow through the second absorption cycle comprising absorption zone A and regeneration zone C comprises 15% of the total solution flow in both cycles.

Scrubbing solution collects at the bottom of zone A in sump 12 at a temperature of about 118° C. and with a potassium bicarbonate fraction [1] of 76%. In regeneration zone D, which is operated at essentially atmospheric pressure, the regenerated solution from zone D collects on collecting plate 44 at a temperature of 108° C. and with a bicarbonate fraction of 38% and is recirculated to zone A without cooling by recycle pump 46 and line 11. Spent scrubbing solution from zone B collects on collecting plate 15 at a temperature of 80° C. and at a potassium bicarbonate fraction of 35%, and is withdrawn by line 16 and regenerated in regeneration zone C. Regenerated solution collects at the bottom of zone C in sump 23 at a temperature of 115° C. and at a bicarbonate fraction of 25%, and is recirculated to the top of zone A by recycle pump 50, cooler 52 where it is cooled to a temperature of 60° C., and line 14.

In the above example, it will be noted that the gas treated in the first absorption zone A travels directly,

---

[1] The "potassium bicarbonate fraction," as used herein, means the proportion of original potassium carbonate ($K_2CO_3$) expressed in percent which has been converted to potassium bicarbonate by reaction with $CO_2$. For example, a solution having a potassium bicarbonate fraction of 25% is obtained by the conversion of 25 mol percent of the potassium carbonate content of the solution to potassium bicarbonate such that the ratio of potassium ions present as potassium carbonate to potassium ions present as potassium bicarbonate is 3 : 1. Since two mols of potassium bicarbonate are produced for each mol of potassium carbonate, the mol ratio of $K_2CO_3 : KHCO_3$ at a 25% bicarbonate fraction is 3 : 2.

without cooling, from zone A to zone B with the advantages as previously described. Because of the higher temperatures employed in the second absorption zone B in contrast to the substantially lower temperatures employed in a cold scrubbing operation, the thermal efficiency of the overall system is markedly higher.

A further advantage of the embodiment illustrated, using potassium carbonate solutions in both absorption zones, one containing relatively low amounts and the other a relatively higher amount of alkanolamine, is that no difficulties are caused by the transfer of small amounts of solution from one zone to another. This may occur, for example, by entrainment of solution from zone A to zone B in the gas stream flowing through chimney 17 of absorber column 10 or by entrainment of solution or some components thereof in the stripping steam passing through chimney 53 of regeneration column 21. The minor changes in solution composition which result can be readily adjusted by adjustment of the composition of the normal amounts of make-up solution that are required from time to time.

The scrubbing solution employed in the first absorption zone for the removal of the bulk of the acid gas may in general be any type of aqueous alkaline scrubbing solution suitable for the bulk removal of $CO_2$ and/or $H_2S$ at absorption temperatures in the vicinity of the atmospheric boiling temperature of the solution. Particularly preferred for this purpose are aqueous solutions of potassium carbonate, particularly relatively concentrated carbonate solutions having potassium carbonate concentrations by weight of 15% to 45%, and preferably from about 22% to 35% (these concentrations being calculated on the assumption that all the potassium carbonate is present as potassium carbonate). Such potassium carbonate solutions for the first purification step are preferably activated by the addition of alkanolamines, alkali metal borates such as potassium or sodium borate, $As_2O_3$, amino acids such as glycine, or other additives which tend to increase the rates of absorption and desorption of acid gas in the potassium carbonate solution. As previously stated, it is particularly preferred to employ potassium carbonate solutions activated by alkanolamines in which the concentration of alkanolamine is less than about 5% by weight, and preferably in the range of from about 0.5% to 4%, and still more desirably in the range of from about 1% to 3% by weight.

The scrubbing solution employed in the second absorption step for fine purification of the gas is a solution of potassium carbonate containing at least about 6%, and generally not more than 15%, of an alkanolamine, the preferred alkanolamine concentration being from about 8% to 12% by weight. The concentration of potassium carbonate in the solution preferably ranges from about 10% to 25% by weight. In general, it has been found desirable to employ scrubbing solutions in the second fine purification step which contain relatively lower potassium carbonate concentrations than in the first bulk-removal absorption step because such more dilute solutions have appreciably higher absorption rates. While their acid-gas carrying capacity is lower, high carrying capacity is not required for the solution used in the second fine purification step.

Suitable alkanolamines for use in the scrubbing solution employed in either the first or the second absorption steps may in general be any of the alkanolamines that have the required solubility in potassium carbonate solutions to provide the solution concentrations indicated. Diethanolamine, $HN(CH_2CH_2OH)_2$, is preferred from the standpoint of cost, relatively low volatility, and effectiveness. However, other alkanolamines such as monoethanolamine, $H_2NCH_2CH_2OH$; or triethanolamine, $$N(CH_2CH_2OH)_3$$

monopropanolamine,  $H_2NCH_2CH_2CH_2OH$; dimethylaminoethanol, $(CH_3)_2N-CH_2CH_2OH$; or diethylaminoethanol, $(C_2H_5)_2N-CH_2CH_2OH$; or similar alkanolamines, may be employed.

As pointed out previously, the regeneration of the scrubbing solution in both regeneration zones is carried out at pressures at or near atmospheric. In some cases, it may be advantageous to operate either or both of the regeneration zones at moderate superatmospheric pressures, namely pressures ranging of the order of 5 to 35 p.s.i.g. (pounds per square inch gage), and more generally in the range of from 10 to 30 p.s.i.g.

It is to be understood, of course, that the invention is not limited to the specific embodiment shown and that other embodiments within the spirit of the invention are included within the scope of the appended claims. For example, the system shown in the drawing may be advantageously modified by introducing an indirect heat exchanger to provide for indirect heat exchange between the hot solution leaving the bottom of regeneration zone C and the relatively cooler solution leaving the bottom of absorption zone B by line 16. By means of such heat exchange, the thermal efficiency of the system can be increased by raising the temperature of the solution entering the top of regeneration zone C by line 48, and at the same time, the cooling duty of cooler 52 can be reduced by lowering the temperature of the regenerated scrubbing solution before passing through cooler 52.

Likewise, while the operation of the first absorption cycle, including the first absorber A and regenerator D, should be substantially isothermal, it is understood that some cooling of the regenerated solution before delivery to the first absorption zone may sometimes be desirable. For example, it may be desirable in some cases to heat-exchange hot, regenerated solution flowing in line 11 with relatively cooler spent solution from absorption zone B flowing in line 16. By this means, the temperature of the solution entering the top of absorption zone A is reduced somewhat while the temperature of the spent solution entering the top of regeneration zone C may be appreciably increased, thus increasing the thermal efficiency of regeneration zone C.

I claim:

1. A method for the removal of acid gases selected from the group consisting of $CO_2$ and $H_2S$ from gas mixtures comprising the steps of contacting said gas mixture in a first absorption zone with a first aqueous alkaline scrubbing solution containing from 15% to 45% by weight of potassium carbonate and from 0.5% to not more than 5% by weight of an alkanolamine, said first absorption zone being maintained under substantial superatmospheric pressure and at a temperature in the vicinity of the atmospheric boiling point of said scrubbing solution, to remove the bulk of said acid gas, and thereafter contacting said partially purified gas mixture in a second separate absorption zone with a second aqueous scrubbing solution having a different composition than said first solution and containing from 10% to 25% by weight of potassium carbonate and from 6% to 15% by weight of an alkanolamine, said second separate absorption zone being maintained under substantial superatmospheric pressure and at a lower temperature of from about 50° C. to 90° C. to remove small residual amounts of said acid gas.

2. A method in accordance with claim 1 in which said first aqueous alkaline scrubbing solution is an aqueous solution containing from 22% to 35% of potassium carbonate and from 1% to 3% of an alkanolamine.

3. A method in accordance with claim 1 in which said second aqueous scrubbing solution is a potassium carbonate solution containing from 10% to 25% by weight of potassium carbonate and from 8% to 12% by weight of an alkanolamine.

4. A method in accordance with claim 1 in which the alkanolamine employed in said second scrubbing solution is an ethanolamine.

5. A method in accordance with claim 1 in which the alkanolamine employed in said second scrubbing solution is diethanolamine.

References Cited

UNITED STATES PATENTS

| | | | |
|---|---|---|---|
| 2,886,405 | 5/1959 | Benson et al. | 23—2 |
| 3,101,996 | 8/1963 | Bresler et al. | 23—2 |
| 3,144,301 | 8/1964 | Mayland | 23—2 |

FOREIGN PATENTS

| | | | |
|---|---|---|---|
| 870,895 | 9/1959 | Great Britain | 23—2 |
| 1,497,042 | 8/1967 | France | 23—2 |
| 770,493 | 3/1957 | Great Britain | 23—2 R |

EARL C. THOMAS, Primary Examiner

U.S. Cl. X.R.

423—232